United States Patent
Chudgar

[11] 3,721,271
[45] March 20, 1973

[54] HOSE CONSTRUCTION
[75] Inventor: Anil H. Chudgar, Manitowoc, Wis.
[73] Assignee: Imperial-Eastman Corporation, Chicago, Ill.
[22] Filed: Oct. 28, 1971
[21] Appl. No.: 193,250

[52] U.S. Cl. ............138/141, 138/172, 156/294, 156/306, 156/309, 161/88, 161/139, 161/150, 161/188, 161/227
[51] Int. Cl. ............................................F16l 11/00
[58] Field of Search ......138/141, 172; 156/306, 294, 156/309; 161/88, 139, 178, 188, 227, 150

[56] References Cited
UNITED STATES PATENTS
3,332,447  7/1967  Holmgren.............................138/141

Primary Examiner—William A. Powell
Assistant Examiner—James J. Bell
Attorney—Axel A. Hofgren et al.

[57] ABSTRACT

A hose construction having an inner tubular portion defining an outer substantially smooth nylon surface and reinforcing means surrounding the outer surface and having nylon fibers nonsolvently, autogenously bonded to the duct surface. Alternatively, or cumulatively, the reinforcing nylon fibers may be nonsolvently, autogenously bonded to the inner surface of a surrounding sheath having an inner substantially smooth nylon surface. A plurality of reinforcing layers may be provided. The securing of the reinforcing fibers to the confronting nylon surface means is effected substantially free of hooked interlocks therebetween.

13 Claims, 10 Drawing Figures

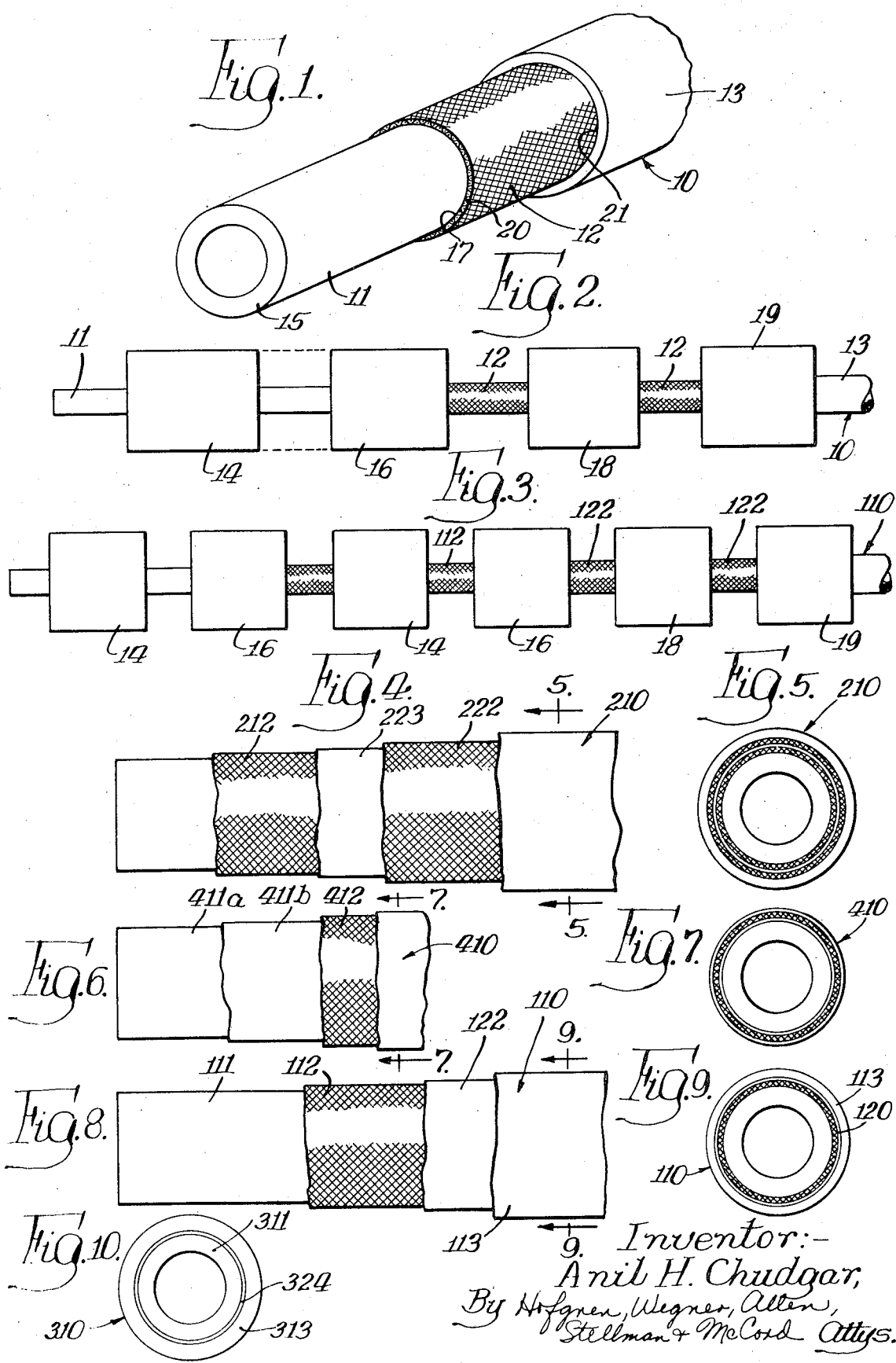

3,721,271

HOSE CONSTRUCTION

BACKGROUND OF THE INVENTION

1. Field of the Invention

This invention relates to tubular ducts and in particular to reinforced hose constructions.

2. Description of the Prior Art

In one form of nylon hose construction wherein a fibrous reinforcement is bonded to a concentric smooth nylon element, heat is employed to soften the confronting nylon surface portions and permit the reinforcement to be embedded in the tubular element. Such a method of effecting the nylon bond is difficult to control and the lack of uniformity of bonding depth has caused problems in the quality control of such manufacture.

In a modified form of nylon hose, as disclosed in the U.S. Pat. Nos. of R. B. Koch, 2,977,839 and 3,251,381, the nylon surfaces are treated with a solvent such as resorcinol, polyhydric alcohol, phenol, etc. After the solvation step, the solvent is caused to be removed. A problem arises in such manufacture in that depth of penetration of the solvent is difficult to control and the solvation action may adversely affect the strength of the hose by reducing the tensile strength of the nylon fibers. Furthermore, the intersection at which the filaments are bonded frequently has a swollen appearance which evidences the solution and redeposition of polymer which is generally referred to as polymer migration. This can affect the bond strength.

SUMMARY OF THE INVENTION

The present invention comprehends an improved nylon hose construction which avoids the disadvantages of the above discussed prior art structures and manufacture by avoiding the heat softening and solvent softening action thereof in a novel and simple manner. More specifically, the present invention comprehends the forming of such a nylon hose construction wherein the nylon reinforcing fibers are bonded to a concentric smooth nylon surface portion of the hose by nonsolvently, autogenously bonding the confronting nylon surface portions. The invention comprehends the nonsolvently disrupting of the intermolecular hydrogen bonds between —NH— and —CO— groups in the nylon surface portions so as to cause a linking of —NH— groups of one surface portion with —CO— groups of the other surface portion, and linking of —CO— groups of the one surface portion with the —NH— groups of the other surface portion. Such nonsolvent autogenous linking of the nylon groups may, for example, be effected by the treatment thereof with anhydrous hydrogen halide gas, e.g., anhydrous hydrogen chloride. Reformation of the intermolecular hydrogen bonds upon removal of the anhydrous hydrogen chloride may then occur with different complementary groups which may be groups of the opposite surface portions so as to effect the desired autogenous bonding.

Thus, it is an object of the present invention to provide bonded, confronting, smooth surfaced and fibrous polyamide structures and blends thereof which are free from external bonding agents and visible polymer migration at the bond points. Another object of this invention is to bond shaped such polyamide structures with said structures being free of external bonding agents in the final product.

Hydrogen chloride is the preferred activating gas because of its fast absorption and desorption rate and comparative ease of handling, although bonding can be achieved by other halides or boron trifluoride. The absorption rate is a function of temperature and pressure.

While aqueous solutions of hydrogen chloride (hydrochloric acid) are known solvents for many polyamides, substantially unionized pure hydrogen chloride is not a solvent and the process of this invention may be carried out under totally anhydrous condition so that the hydrogen chloride does not solvate the nylon.

While the mechanism of the bonding is not completely understood, it is believed that it is based on disruption of hydrogen bonds between the polymer chains by formation of an HCl complex with the amide group. Many of the physical properties of polyamide depend to a great extent on the intermolecular hydrogen bonds between the —CO— and —NH— groups in adjacent polymer chains. The bonds form cross links between the molecular chains, increasing such properties as melting point and tensile strengths. When these bonds are disrupted by the action of the hydrogen chloride, the polymer chains within the structure become more flexible and tend to shift to relieve the stress caused by tension or exposure pressure on the structure. However, two different polyamides which are self-bonding can be bonded to one another.

The use of such nylon bond-opening materials is known in connection with interlocked fiber materials, such as in U.S. Pat. Nos. 3,516,900 and 3,556,895 of W. C. Mallonee et al. and U.S. Pat. No. 3,536,556 of P. J. Stevenson et al. The present invention comprehends such bonding between fibrous reinforcing material and a smooth surface material so as to provide the desired reinforcing molecularly joined bond free of hooked interlocks of the fibers about smooth surface portions. Thus, the present invention comprehends the nonsolvent, autogenous bonding of nylon structure free of mechanical interlocking such as may occur where two fibrous bodies are bonded together.

BRIEF DESCRIPTION OF THE DRAWING

Other features and advantages of the invention will be apparent from the following description taken in connection with the accompanying drawing wherein:

FIG. 1 is a perspective view of a hose construction embodying the invention;

FIG. 2 is a diagrammatic schematic illustration of a method of forming the hose construction;

FIG. 3 is a diagrammatic schematic illustration of a modified method of forming a hose construction wherein a plurality of braid reinforcement is provided;

FIG. 4 is a side elevation of a modified form of hose construction wherein a pair of reinforcing layers is provided separated by a tubular portion;

FIG. 5 is a transverse section thereof taken substantially along the line 5—5 of FIG. 4;

FIG. 6 is a side elevation of a further modified form of hose construction embodying the invention having a pair of nylon core elements;

FIG. 7 is a transverse section thereof taken substantially along the line 7—7 of FIG. 6;

FIG. 8 is a side elevation of still another modified form of hose construction embodying the invention having a pair of braid reinforcing layers in overlying relationship;

FIG. 9 is a transverse section thereof taken substantially along the line 9—9 of FIG. 8; and FIG. 10 is a transverse cross section of a yet further modified form of hose construction embodying the invention utilizing a spiral wrap reinforcement.

DESCRIPTION OF THE PREFERRED EMBODIMENTS

In the exemplary embodiment of the invention as disclosed in FIGS. 1 and 2 of the drawing, a hose construction manufacture is shown to comprise the forming of a hose generally designated 10 having a tubular core 11, a reinforcing braid 12 concentrically surrounding the core 11, and a protective sheath 13 concentrically surrounding the reinforcing braid 12. As indicated above, where the braid is formed at least in part of nylon fibers, it is desirable to bond the nylon material to the confronting core and/or sheath by a highly accurately controlled bonding process providing uniform bond strength with minimum weakening of the nylon fibers. The present invention comprehends non-solvently, autogenously bonding the nylon fibers to a nylon surface portion of the core 11 and/or sheath 13.

Thus, as shown in FIG. 2, the tubular core 11 is delivered to a suitable means 14 for subjecting the outer nylon surface portion 15 of core 11 to an anhydrous hydrogen halide (HCl) for temporarily disrupting the intermolecular hydrogen bonds between —NH— and —CO— groups of the nylon surface portion 15. Examples of such hydrogen bond-disrupting material are hydrogen halides, such as hydrogen chloride, boron trifluoride, etc., such as disclosed in the above-mentioned U.S. Pat. Nos. 3,516,900, 3,556,895 and 3,536,556. The activating material preferably comprises an anhydrous gas and is preferably maintained at a temperature of approximately 20° to 25° C. for improved uniform treatment of the nylon, it being understood that the autogenous bonding effect may be effected at higher or lower temperatures as desired and at preselected pressures as desired. The anhydrous reacting material avoids solvating action during bonding and may be readily removed upon completion of the bonding operation by washing with water.

The braid 12 is applies to the thusly treated surface portions 15 and 17. The braid covered core is then delivered to suitable means 18 for removing the gaseous treating material. Illustratively, means 18 may comprise a suitable washing means or a heating oven to thermally drive off the gaseous material. The removal of the gaseous treating material permits the —CO— and —NH— groups to reform intermolecular hydrogen bonds. As portions of the braid fibers are now intimately juxtaposed to the surface portion 15 of the core 11, the reformation of the intermolecular hydrogen bonds between —CO— and —NH— groups may be between the two different surface portions 15 and 17 so that a nonsolvent autogenous bond results wherein the polymer chains of nylon of one surface portion are molecularly integrated with the polymer nylon chains of the other surface portion effectively forming cross links between polyamide chains. As the interconnection between the hose surface portions does not rely on a solvating action or a high temperature fusing action, an improved accurately controlled bonding between the surface portions is obtained in the absence of total mechanical interlocking of the fibers of portion 17 of braid 12 with the smooth outer surface portion 15 of core 11.

The now bonded assembly of the core 11 and reinforcing braid 12 may be covered with a suitable sheath 13 as desired by delivery thereof to a suitable conventional sheathing means 19 which may comprise a conventional extruder. Where the sheath 13 is formed of nylon, the outer surface 20 of the reinforcing braid 12 may be subjected to the intermolecular hydrogen bond disrupting gas as by conducting the previously bonded core and braid assembly through the treatment means 14 prior to the delivery thereof to the sheathing means 19 thereby to effect the above described bond now between the outer surface portion 20 of the braid 12 and the inner surface portion 21 of the nylon sheath 13. The treating agent may be similarly removed subsequent to the extrusion of the sheath 13 onto the treated outer portion 20 of the braid to provide the desired nonsolvent, autogenous bond of the sheath to the braid. The hose forming may be a continuous or batch forming operation as desired.

As shown in FIG. 3, a plurality of braid layers may be applied in superposed relationship to form a hose, such as hose 110, as shown in FIG. 8. Thus, a first braid layer 112 may be bonded to the nylon core 111 as discussed above relative to hose construction 10. The outer surface portion 120 of the braid 112 may be treated with the intermolecular hydrogen bond disrupting gas and a second braid layer 122 provided concentrically about braid layer 112 with the fibers of the second braid layer being bonded to the fibers of the first braid layer 112 by disrupting and reforming the hydrogen bond between —CO— and —NH— groups, as discussed above. Illustrative apparatus for forming such a double braid layer hose is shown in FIG. 3 including a plurality of gas treating means 14 and braiding means 16. As discussed above relative to hose construction 10, the sheath 113 may be bonded to the outer braid 122 if desired by the non-solvent, autogenous bonding process discussed above where the sheath is formed of nylon material.

As illustrated in FIGS. 4 and 5, a further modified hose construction generally designated 210 may comprise a hose construction generally similar to hose construction 110 but having an intermediate tubular portion 223 between the braid layers 212 and 222. Tubular portion 223 may be bonded to either, or both, of braid layers 212 and 222 as desired. Where the tubular portion 223 is formed of nylon, the bond may be formed as a nonsolvent, autogenous bond as discussed above.

The reinforcing layer may be in the form of a braid as discussed above, or any other suitable configuration for providing the desired reinforcing of the tubular hose portions. Thus, as illustrated in FIG. 10, the reinforcement may comprise a spiral wrap 324 wrapped about the core 311. Different layers of the spiral wrap may be nonsolvently, autogenously bonded to each other as well as to either, or both, of core 311 and sheath 313 as desired. Hose construction 310 may similarly be arranged to have a plurality of reinforcing layers as in hose construction 110 and 210, as well as the single layer of hose construction 10.

The invention further comprehends the nonsolvent, autogenous bonding of confronting smooth surface portions of a plurality of tubular elements in the hose construction, such as inner core element 411a and outer core element 411b of a modified form of hose construction 410 as shown in FIG. 6. Thus, core element 411a is subjected to the intermolecular hydrogen bond disrupting gas in means 14 prior to the placement of tubular portion 411b thereabout such as by extrusion thereover. The outer surface of tubular portion 411b may be bonded to the braid 412 as in the previously described embodiments by the previously described nonsolvent, autogenous bonding process.

To obtain the desired bonding, the confronting surface portions should be in contact with each other. The hose elements may be pressed together prior to treatment thereof by the intermolecular hydrogen bond disrupting gas. In such a process, the gas is directed through the braid to between the braid and core. Pressing together of the braid and core elements subsequent to the treatment with the intermolecular hydrogen bond disrupting gas provides an improved strength by causing the braid fibers to be pressed into the core somewhat to provide a greater surface area of bond between the fibers and core.

The subjection of the nylon to the intermolecular hydrogen bond disrupting material may be relatively short such as utilizing exposure time of approximately one second to several minutes. The concentration of the bonding gas may be widely varied. By controlling the exposure time, gas pressure and concentration of the gas, the depth of penetration of the gas may be accurately controlled. It has been found that penetrations of as little as five percent (5 percent), or less, of the cross sectional area of the nylon structure provides good bonding. Prior history of treatment of the nylon may affect the desired treatment time and gas concentration to provide the optimum bonding action.

While the removal of the bonding gas as discussed above may be effected by heating the treated nylon materials, other removal methods may be employed within the scope of the invention such as by washing the structure with water or a dilute base solution. Where the removal of the gas is effected solely by heating, the temperature may be maintained substantially below the softening or melting temperature of the nylon so as to avoid altering the physical characteristics thereof.

By causing only the confronting surface portions of the tubular nylon element and braid element to be so bonded, an improved hose structure results with the remaining fibers of the braid being relatively movable to provide improved flexibility of the resultant hose structure while yet positively maintaining the braid in retained association with the tubular elements. As the braid is bonded to the tubular element over the entire confronting surface portion thereof, the cutting of the hose structure at any transverse section results in a clean cut without ravelling of the fibers.

The braid may be comprised solely of nylon fibers or may be a composite of fibers with only one portion thereof comprising nylon fibers, as desired. Thus, the non-nylon fibers may be free of autogenously bonding with the nylon tubular elements.

The word "nylon" as used herein includes polyamides such as Poly(6-aminocaproic acid) (Nylon 6), polyhexamethylene adipamide (Nylon 6/6), and polyhexamethylene sebacicamide (Nylon 6/10), which have been found to provide excellent bonding by the nonsolvent, autogenous bonding method disclosed. The polyamide should have a substantial number of accessible —NHCO— groups suitable for the bond-breaking and reformation action as discussed above. Most wholly aromatic polyamides have been found unsatisfactory for such bonding. An excellent example of a bond-breaking material for use with such polyamides is anhydrous hydrogen chloride, the strength thereof being suitably controlled by dilution with an inert solvent such as chloroform, acetone, benzene and the like for accurate control of the bond.

The foregoing disclosure of specific embodiments is illustrative of the broad inventive concepts comprehended by the invention.

I claim:

1. A hose construction comprising:
   a tubular duct structure having a substantially smooth nylon surface portion; and
   reinforcing means surrounding said duct and having nylon fiber fabric structure nonsolvently autogenously bonded to said duct surface portion by a linking of —NH— groups of one of said duct and fabric structures with —CO— groups of the other of said structures and linking of —CO— groups of said one structure with —NH— groups of said other structure, substantially free of hooked interlocks between said fibers and said duct structure surface portion.

2. The hose construction of claim 1 wherein said reinforcing means includes fibers disposed therein having contact with said duct structure surface free of bonding therewith.

3. The hose construction of claim 1 wherein said reinforcing means is tensioned circumferentially about said duct structure.

4. The hose construction of claim 1 wherein said duct structure comprises a substantially homogeneous tube of nylon.

5. The hose construction of claim 1 wherein said reinforcing means comprises a textile fabric.

6. The hose construction of claim 1 wherein said reinforcing means comprises a textile fabric having nylon fibers and fibers formed of a different material contacting said duct structure surface portion, said different material fibers being free of molecular bonding therewith.

7. The hose construction of claim 6 wherein said fabric comprises a blend of said nylon and different material fibers.

8. The hose construction of claim 1 wherein said reinforcing means comprises a textile fabric having surface fibers bonded to said duct structure surface portion by said linking of —CO— and —NH— groups, and further having fibers spaced from said duct structure surface portion free of fixed connection to said surface portion.

9. The hose construction of claim 1 wherein said reinforcing means comprises a textile fabric strip wrapped about said duct structure with the nylon fibers thereof bonded to said duct structure surface portion and to each other between overlying turns of the wrapped strip by said linking of —CO— and —NH— groups.

10. The hose construction of claim 1 wherein said reinforcing means comprises a plurality of layers of textile fabric disposed concentrically about said duct structure with nylon fibers of the innermost layer thereof bonded to said duct structure surface portion and with nylon fibers of the different layers bonded to each other by said linking of —CO— and —NH— groups.

11. The hose construction of claim 10 wherein said layers comprise a spiral wrap about said duct structure.

12. The hose construction of claim 10 including a tubular layer of nylon material having a smooth inner surface concentrically overlying said reinforcing means, nylon fibers of said reinforcing means being nonsolvently, autogenously bonded to said duct surface portion by a linking of —NH— groups of one of said duct and fabric structures with —CO— groups of the other of said structures and linking of —CO— groups of said one structure with —NH— groups of said other structure, substantially free of hooked interlocks between said fibers and said duct structure surface portion.

13. The hose construction of claim 10 including a tubular layer of nylon material having a smooth inner surface concentrically overlying said reinforcing means, nylon fibers of said reinforcing means being nonsolvently, autogenously bonded to said duct surface portion by a linking of —NH— groups of one of said duct and fabric structures with —CO— groups of the other of said structures and linking of —CO— groups of said one structure with —NH— groups of said other structure, substantially free of hooked interlocks between said fibers and said duct structure surface portion, and a second reinforcing means surrounding said tubular layer and having nylon fibers nonsolvently autogenously bonded to said duct surface portion by a linking of —NH— groups of one of said duct and fabric structures with —CO— groups of the other of said structures and linking of —CO— groups of said one structure with —NH— groups of said other structure, substantially free of hooked interlocks between said fibers and said duct structure surface portion.

* * * * *